Feb. 25, 1947.   L. E. LEUPE   2,416,487

PISTON CONSTRUCTION

Filed July 14, 1945

INVENTOR.
LOUIS E. LEUPE
BY Edward C. Healy
ATTORNEY

Patented Feb. 25, 1947

2,416,487

UNITED STATES PATENT OFFICE 2,416,487

PISTON CONSTRUCTION

Louis E. Leupe, Burlingame, Calif.

Application July 14, 1945, Serial No. 605,148

2 Claims. (Cl. 309—13)

This invention relates to an improved piston for use in internal combusion engines and has particular reference to an improved form of construction for enabling the piston wall to resiliently yield inwardly when the outer diameter of the piston expands to a greater size than the inner diameter of the cylinder due to the extreme heat developed in the operation of the engine and to the methods employed for externally cooling the cylinders. It is desirable to have the skirt portion of the piston snugly fit in the cylinder in order to produce a seal that will assist the piston rings in preventing leakage of gas past the piston. In the operation of the engine the pistons are subjected to a higher heat temperature than the cylinders due to the provision of means for cooling the walls of the cylinders and this difference in extreme heat temperature causes the pistons to expand to a greater degree than the cylinders, resulting in binding and excessive friction during the reciprocative movement of the pistons in the cylinders.

It is therefore an object of the present invention to provide an improved form of construction for pistons used in internal combustion engines, Diesel engines and the like, whereby the piston walls will be capable of resiliently yielding to make up for the greater expansion of the pistons with respect to the cylinders and will enable the pistons to operate with the greatest efficiency during the normal operation of the engine.

Another object of the present invention is to form a pair of oppositely opposed longitudinal slots through the circular periphery of the piston wall forming the skirt portion and to continue said piston wall inwardly around said slots, producing a pair of oppositely opposed inwardly extending channel formations that extend from the bottom of the skirt portion to the head portion and to further provide a transverse slot adjacent the head portion, said slot connecting with the groove of the channel formations thus providing a piston with a segmented wall that is completely free to evenly expand and contract from end to end and thus producing a piston that will form the proper seal, will not bind and will operate with the maximum efficiency.

Other objects and advantages will be apparent during the course of the following description.

In the accompanying drawings forming a part of the specification and in which like numerals are employed to designate like parts throughout the same;

Figure 5:
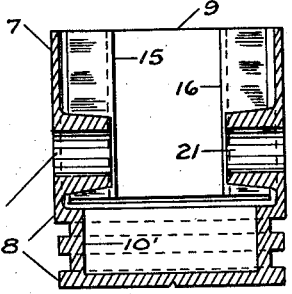
Fig. 5 is a longitudinal sectional view taken on line 5—5 of Fig. 3.

Referring in detail to the drawings and to the numerals thereof, the numeral 7 designates the main body portion of the piston, commonly called the skirt, and the numerals 8 and 9, the head portion and bottom respectively. The numeral 10 designates a series of circumferential grooves for holding conventional piston rings not shown. The head portion 8 of the piston has a slightly smaller diameter than the skirt 7, as shown by the dotted circle in Fig. 3, in order to allow for heat expansion, as this part of the piston which carries the piston rings is formed into a greater thickness of metal as indicated at 10' in Fig. 5 and is not yielding. The body portion 7 of the piston must have a snug fit with the cylinder in order to reduce gas leakage and must therefore be resiliently contractable in order to allow for heat expansion.

Figure 1:
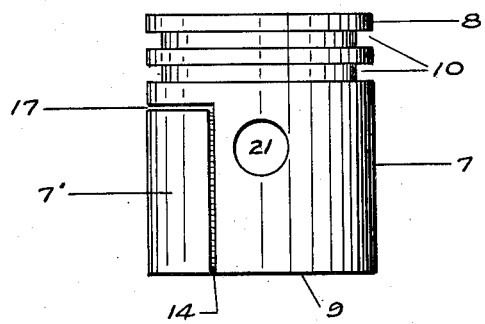
Fig. 1 is a vertical side elevational view of the piston, looking directly into one of the elongated channel formations and showing the cross slot that extends through a portion of the peripherial wall of the piston and into the groove of the channel formation.
Figure 2:
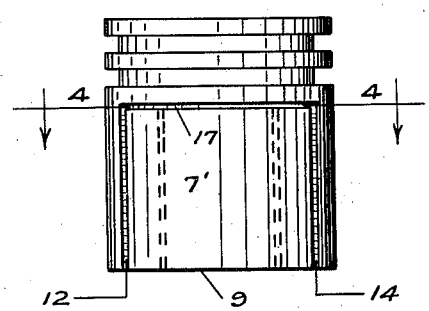
Fig. 2 is a vertical side elevational view of the piston showing both of the oppositely opposed channel formations and the cross slot that extends from one to the other.
Figure 4:
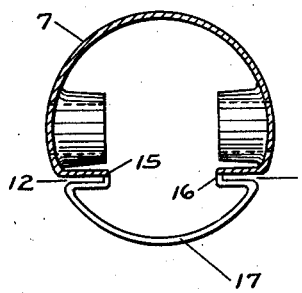
Fig. 4 is a sectional plan view taken on line 4—4 of Fig. 2, looking in direction of the arrows.
Figure 3:
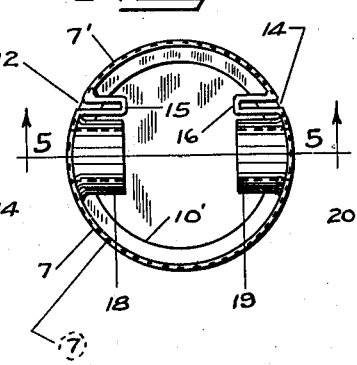
Fig. 3 is a bottom plan view of the improved piston and particularly illustrates the oppositely opposed channel formations and the manner in which the periphery of the piston wall extends inwardly to form the same.

The improved means provided for enabling the skirt of the piston to be resiliently contractable consists in forming a pair of oppositely opposed elongated slots 12 and 14 through the periphery of the cylindrical wall 7 and extending the metal from said wall inwardly and around said slots, providing a pair of oppositely opposed elongated channel formations 15 and 16 that are integral with the cylindrical wall 7 as shown in Fig. 3 and longitudinally extending from the bottom 9 of the piston to a cross slot 17 that cuts through the wall 7 of the piston and transversely runs from one channel formation to the other, as shown in Figs. 1 and 2 and 4. It will be noted that a segmental wall 7' is thus formed between the channel formations and the cross slot and is completely free to resiliently contract in an even manner, thus enabling the piston to be reciprocative in the cylinders with the maximum of efficiency during the normal operation of the engine.

A pair of bosses 18 and 19 are formed within the piston, each boss having a hole 20 and 21, respectively, forming suitable wrist pin bearings. The improved piston is preferably made light in weight and is cam ground and the skirt portion is formed as thin as possible to give the proper resiliency and is constructed out of any suitable metal that will best serve the purpose of the invention.

It is to be understood that the form of the invention herewith shown and described is to be taken as a preferred example of the same and that various changes relative to the material, size, shape and arrangement of parts, may be resorted to without departing from the spirit of the invention or the scope of the subjoined claims.

Having thus described my invention, I claim:

1. A piston embodying in its construction a head portion and a skirt portion, a pair of oppositely opposed channel formations inwardly extending from the outer periphery of the skirt portion and longitudinally extending from the bottom thereof toward the head portion and in proximity thereto, and a transverse slot provided through said periphery and joining the channel formations adjacent the head portion.

2. A piston embodying in its construction a head portion and a skirt portion formed from a single piece of material, the head portion having a smaller outer and inner diameter than the skirt portion, a series of circumferential grooves in the periphery of the head portion for holding a series of piston rings, a pair of oppositely opposed bosses provided within the skirt and having openings therein capable of forming wrist pin bearings, a pair of oppositely opposed channel formations inwardly extending from the outer periphery of the skirt portion and longitudinally extending in parallelism from the bottom thereof toward the head portion and in proximity thereto, said channel formations being positioned on one side of said bosses, and a transverse slit provided through said periphery and joining the inside of both channel formations adjacent the head portion.

LOUIS E. LEUPE.

REFERENCES CITED

The following references are of record in the file of this patent:

UNITED STATES PATENTS

| Number | Name | Date |
| --- | --- | --- |
| 1,730,120 | Jardine | Oct. 1, 1929 |
| 1,909,633 | Rasmussen | May 16, 1933 |
| 1,983,290 | Hartog | Dec. 4, 1934 |
| 2,066,613 | Day | Jan. 5, 1937 |